US008566366B2

(12) United States Patent
Moriwaki

(10) Patent No.: US 8,566,366 B2
(45) Date of Patent: Oct. 22, 2013

(54) FORMAT CONVERSION APPARATUS AND FILE SEARCH APPARATUS CAPABLE OF SEARCHING FOR A FILE AS BASED ON AN ATTRIBUTE PROVIDED PRIOR TO CONVERSION

(75) Inventor: Kagumi Moriwaki, Kawanishi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1656 days.

(21) Appl. No.: 10/862,454

(22) Filed: Jun. 8, 2004

(65) Prior Publication Data
US 2005/0203936 A1 Sep. 15, 2005

(30) Foreign Application Priority Data

Mar. 9, 2004 (JP) .................................. 2004-066220

(51) Int. Cl.
*G06F 7/00* (2006.01)

(52) U.S. Cl.
USPC ........................................................ 707/809

(58) Field of Classification Search
USPC ........................ 707/802, 803, 821, 822, 825
See application file for complete search history.

(56) References Cited

U.S. PATENT DOCUMENTS

| 5,386,564 | A * | 1/1995 | Shearer et al. | 707/101 |
|---|---|---|---|---|
| 5,729,741 | A * | 3/1998 | Liaguno et al. | 707/104.1 |
| 6,012,068 | A * | 1/2000 | Boezeman et al. | 707/104.1 |
| 6,195,664 | B1 * | 2/2001 | Tolfa | 707/200 |
| 6,260,043 | B1 * | 7/2001 | Puri et al. | 707/101 |
| 6,377,952 | B1 | 4/2002 | Inohara et al. | |
| 2002/0016800 | A1 * | 2/2002 | Spivak et al. | 707/523 |
| 2002/0103717 | A1 * | 8/2002 | Swart et al. | 705/26 |
| 2002/0144239 | A1 * | 10/2002 | Bentley | 717/136 |
| 2002/0169793 | A1 * | 11/2002 | Sweeney | 707/204 |
| 2003/0126553 | A1 * | 7/2003 | Nagata | 715/500 |
| 2003/0212703 | A1 * | 11/2003 | Yoshioka | 707/102 |

(Continued)

FOREIGN PATENT DOCUMENTS

| JP | 9-190330 | 7/1997 |
|---|---|---|
| JP | 11-3296 | 1/1999 |

(Continued)

OTHER PUBLICATIONS

Yoshiki Matsuda, "Document Information Management System Bibliotheca/IS(1)", a Collection (4) of Articles in the 49th National Conference, Information Processing Society of Japan, Sep. 30, 1994, pp. 4-201 to 4-202.

(Continued)

*Primary Examiner* — Robert Beausoliel, Jr.
*Assistant Examiner* — Nirav K Khakhar
(74) *Attorney, Agent, or Firm* — Buchanan Ingersoll & Rooney PC

(57) ABSTRACT

A portion identifying a file attribute identifies an attribute of an unconverted file (e.g., a name of an application used to create a document). A file format converter converts the file in a selected format. A portion adding a file attribute and writing it to a file provides the identified file attribute in the form of text and adds it to the file. After a file is converted in format, an original file attribute can still be referred to. A file attribute, such as an application used to create a document, can be used to sort and search for a file.

31 Claims, 10 Drawing Sheets

(56) References Cited

U.S. PATENT DOCUMENTS

| | | |
|---|---|---|
| 2004/0177159 A1* | 9/2004 | Butterfield et al. ........... 709/246 |
| 2004/0181746 A1* | 9/2004 | McLure et al. ................ 715/500 |
| 2004/0249863 A1* | 12/2004 | Kawamura ................. 707/104.1 |
| 2005/0132278 A1* | 6/2005 | Yoshida ........................ 715/513 |

FOREIGN PATENT DOCUMENTS

| | | |
|---|---|---|
| JP | 11-134227 | 5/1999 |
| JP | 11-312231 | 11/1999 |
| JP | 2000-315209 | 11/2000 |
| JP | 2002-259173 | 9/2002 |
| JP | 2002-269126 | 9/2002 |

OTHER PUBLICATIONS

Yoshinari Fujimori, "21st Century Comes into View, IGAS' 99, Road to Digital Smart Factory and Cross Media", Insatsu Joho, Japan, Printing-Publishing Institute, Sep. 1, 1999, vol. 59, No. 9, pp. 22-25.

Hideaki Daimon, "Development of a Document Digitizing System, -Distributed Digitizing and Evaluation-", Technical Report, The Institute of Electronics, Information and Communication Engineers, May 13, 1998, vol. 98, No. 42, pp. 47-54.

Hiroshi Kotani, "Look No Further! Strongest-Ever Electronic Scrap", Nikkei PC 21, vol. 8, No. 1, Japan, Nikkei Business Publications, Inc., Jan. 1, 2003, vol. 8, No. 1, pp. 38-46.

* cited by examiner

| EXTENSION | NAME OF APPLICATION USED FOR CREATION |
|---|---|
| doc | WORD |
| xls | EXCEL |
| ppt | POWERPOINT |

FIG.10

| FILE NAME | EXTENSION | DATE OF CREATION | TYPE OF APPLICATION (WORD) | TYPE OF APPLICATION (EXCEL) | TYPE OF APPLICATION (POWERPOINT) |
|---|---|---|---|---|---|
| title1 | pdf | 2003/1/7 | 100 | 0 | 0 |
| title2 | pdf | 2003/1/11 | 0 | 100 | 0 |
| title3 | pdf | 2003/1/12 | 80 | 20 | 10 |
| title4 | pdf | 2003/2/1 | 100 | 0 | 0 |
| title5 | pdf | 2003/2/7 | 0 | 100 | 0 |
| title6 | pdf | 2003/2/7 | 20 | 10 | 100 |
| title7 | pdf | 2003/3/10 | 100 | 0 | 0 |

FIG.11

| FILE NAME | EXTENSION | DATE OF CREATION | TYPE OF APPLICATION (WORD) | TYPE OF APPLICATION (EXCEL) | TYPE OF APPLICATION (POWERPOINT) |
|---|---|---|---|---|---|
| title1 | pdf | 2003/1/7 | 100 | 0 | 0 |
| title4 | pdf | 2003/2/1 | 100 | 0 | 0 |
| title7 | pdf | 2003/3/10 | 100 | 0 | 0 |
| title3 | pdf | 2003/1/12 | 80 | 20 | 10 |
| title6 | pdf | 2003/2/7 | 20 | 10 | 100 |
| title2 | pdf | 2003/1/11 | 0 | 100 | 0 |
| title5 | pdf | 2003/2/7 | 0 | 100 | 0 |

FORMAT CONVERSION APPARATUS AND FILE SEARCH APPARATUS CAPABLE OF SEARCHING FOR A FILE AS BASED ON AN ATTRIBUTE PROVIDED PRIOR TO CONVERSION

This application is based on Japanese Patent Application No. 2004-66220 filed with the Japan Patent Office on Mar. 9, 2004, the entire content of which is hereby incorporated by reference.

BACKGROUND OF THE INVENTION

1. Field of the Invention

The present invention relates generally to format conversion apparatus and file search apparatus, and in particular to those capable of searching for a file having been converted in format, as based on an attribute thereof provided before it is converted in format.

2. Description of the Related Art

Japanese Laid-Open Patent Publication No. 2002-269126 discloses a document management system assigning a document image a property for management. This system adds to a document image an attribute of a document type corresponding to a type of form identified, such as a report, date and time, and the like. Thus a document image can efficiently be assigned an attribute. Note that each document type is assigned an attribute as previously defined.

Documents, image files and the like may be converted to a portable document format (PDF) file by using application software such as software for example of PDF WRITER of Adobe Systems Incorporated.

To search among document files recorded in a computer for a desired file an application (an extension) used to create the file may be used therefor. However, if a document created by WORD, EXCEL or the like is converted to a PDF file, its extension would be ".pdf" and the EXPLORER or the like can no longer be used to use the extension as a keyword for search. In other words, in conventional art once a file has been changed in format the file can no longer be searched for by the type of the application used to create the file.

SUMMARY OF THE INVENTION

The present invention has been made to overcome the above disadvantage and contemplates a format conversion apparatus and file search apparatus capable of using an unconverted file's attribute(s) such as an extension to help to search for the file after it is converted in format.

To achieve the above object the present invention in one aspect provides a format conversion apparatus including: a determiner determining an attribute of an input or created file; a converter converting a format of the file; and a portion adding as additional information an attribute of the file provided prior to conversion to the file when it is converted.

The present invention in another aspect provides a file search apparatus including: a storage storing a plurality of files converted in format and having recorded therein as additional information an attribute thereof provided before the files are converted; a first input device receiving from a user an attribute prior to format conversion of a file to be retrieved as desired from among the files stored in the storage; a reader reading an attribute of the file stored in the storage; and a searcher searching the storage for a desired file as based on the attribute received by the first input device and the attribute read by the reader.

In accordance with the present invention an attribute of a file that is provided before it is converted can still be added as additional information to the file after it is converted. The information can be used to help to search for and sort the file.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 10 shows a specific example of a file list sorting files, stored in a file storage 201 shown in FIG. 7, by their dates of creation.

FIG. 11 shows a specific example of a file list sorting files, stored in the FIG. 7 file storage 201, by their types of application.

DESCRIPTION OF THE PREFERRED EMBODIMENTS

The present invention in one embodiment provides a document file format conversion apparatus and file sorting apparatus, as described hereinafter.

In the present embodiment the format conversion apparatus provides an unconverted document's attribute information in the form of text and adds it to the file when it is converted. Even after format conversion an original file attribute can be referred to so that a file attribute, such as a type of application used to create a document, can be used to sort and search for a file.

Figure 1:
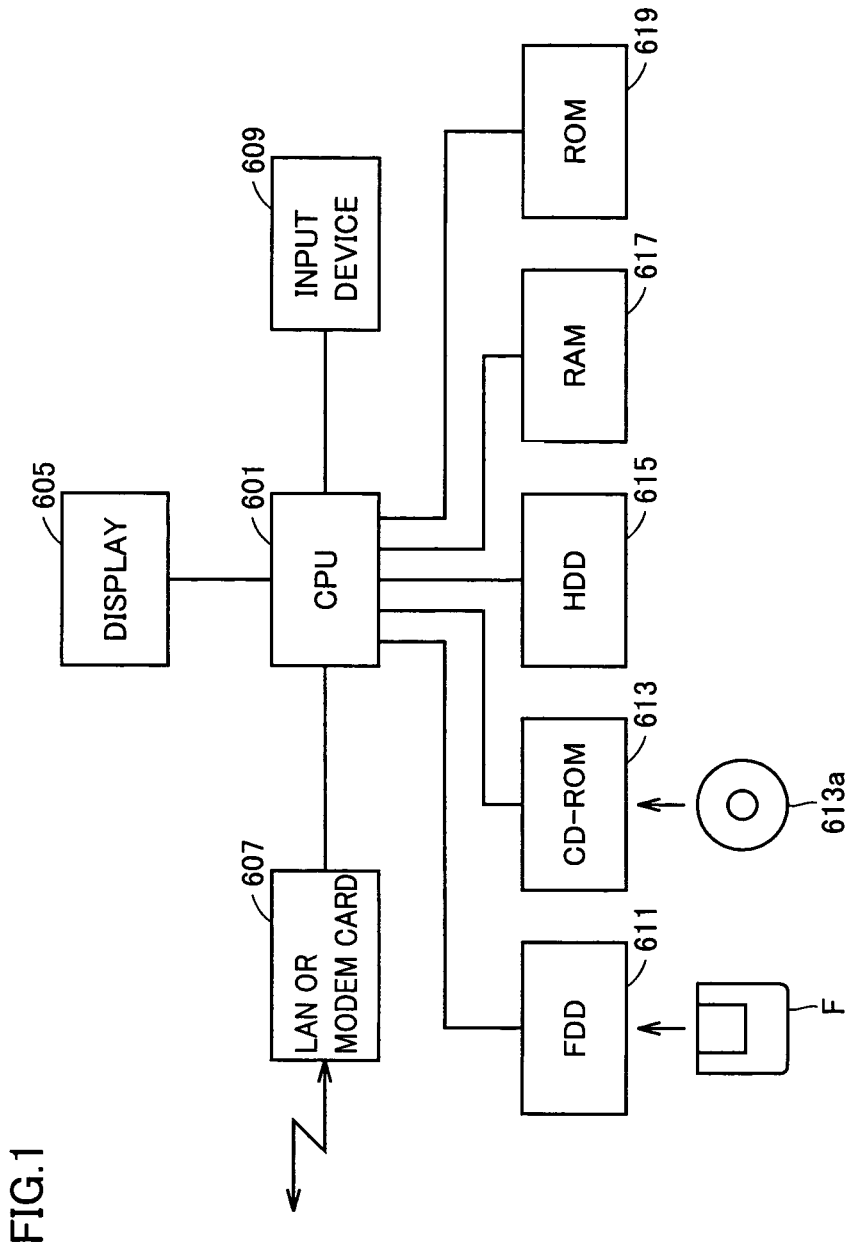
FIG. 1 is a block diagram showing a hardware configuration of a document format conversion apparatus and file sort apparatus in accordance with the present invention in one embodiment.

FIG. 1 is a block diagram showing a hardware configuration of the present document format conversion apparatus and file sorting apparatus in one embodiment.

With reference to the figure, the apparatus is formed of a personal computer (PC). The PC includes a CPU 601 generally controlling the apparatus, a display 605, a local area network (LAN) card 607 (or modem card) used for example to connect with a network and allow external communications, an input device 609 configured for example of a keyboard, a mouse and/or the like, a flexible disk drive 611, a CD-ROM drive 613, a hard disk drive 615, a RAM 617 and a ROM 619.

FD drive 611 allows a program or other similar data recorded on a flexible disk F to be read, and CD-ROM drive 613 allows a program or other similar data recorded on a CD-ROM 613a to be read.

Figure 2:
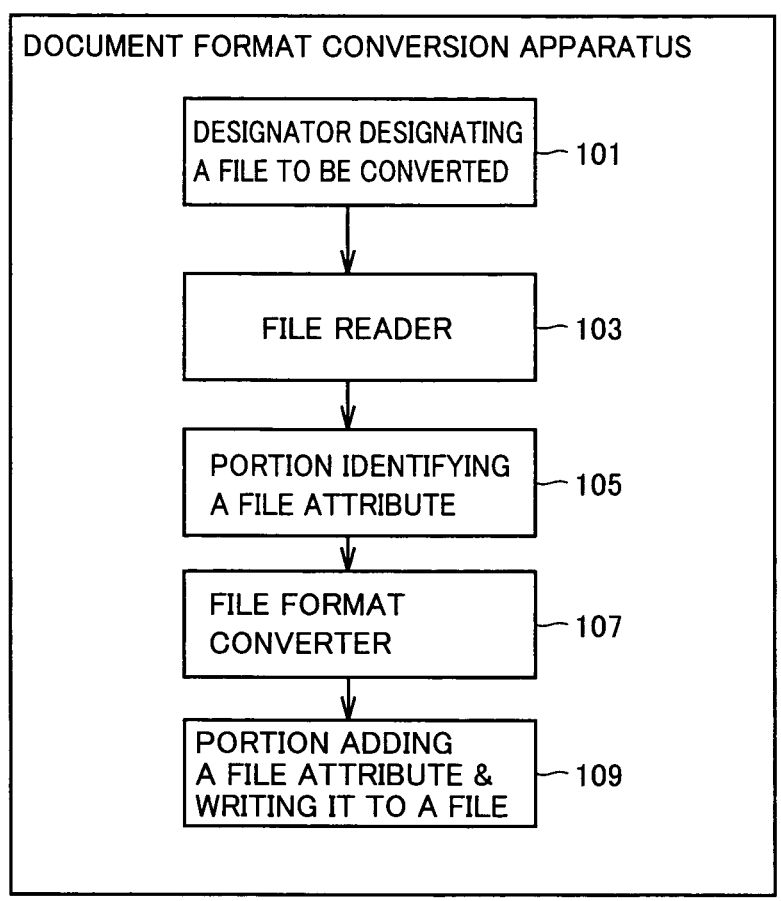
FIG. 2 is a functional block diagram of a document format conversion apparatus.

FIG. 2 is a functional block diagram of the document format conversion apparatus.

With reference to the figure, the document format conversion apparatus includes a designator designating a file to be converted 101, a file reader 103, a portion identifying a file attribute 105, a file format converter 107, a portion adding a file attribute and writing it to a file 109.

Designator 101 selects a file to be converted in format, (e.g., a WORD document, a document image read via a scanner, and the like), and a type of file applied by conversion (e.g., PDF, TIFF and the like).

File reader 103 reads a file selected by designator 101 and develops it in a memory.

Portion 105 identifies an attribute of the file read into the memory.

File format converter 107 converts the developed data to the format selected by designator 101.

Portion 109 adds the identified file attribute in the form of text and writes it on the file together with the data converted by format converter 107.

The document format conversion apparatus includes portion 109 providing information of an attribute of an unconverted document in the form of text and adding it to the file after it is converted. Even after format conversion an original file attribute can be referred to so that a file attribute, such as a type of application used to create a document, can be used to sort and search for a file.

Figures 3, 4:
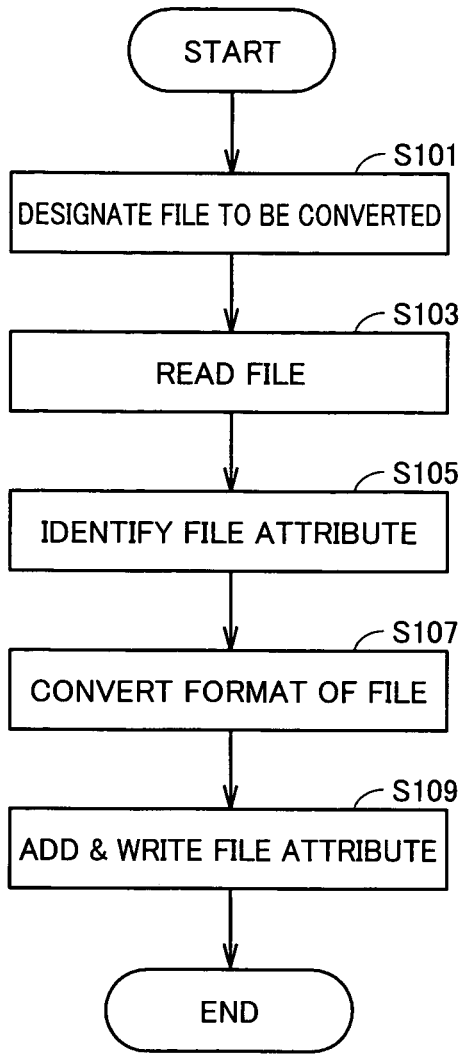
FIG. 3 is a flow chart of a process performed by a document format conversion apparatus.
FIG. 4 is a view for illustrating a method of identifying a file attribute.

FIG. 3 is a flow chart representing a process performed by the document format conversion apparatus.

With the reference to figure, at step (S)101 a file to be converted and a file format applied by the conversion are designated by and received from a user. The file format applied by the conversion for example includes PDF, highly compressed PDF, TIFF and the like.

At S103, the file is read and developed in a memory. At S105, an attribute of the read file is identified.

More specifically, if a file is a document file then the rule shown in FIG. 4 is followed to determine from an extension the type of an application used to create the file, and set it as a file attribute. More specifically, if files prior to conversion have extensions "doc", "xls" and "ppt", respectively, the files have been created by WORD, EXCEL, and POWERPOINT, respectively, and they are set as their respective files' attributes. Furthermore, a registry may be referred to to determine the same.

If a file is a document image, then whether it is a character(s), a photograph(s), a table(s), or a diagrammatic region(s) is determined and from a region's location, size and the like a level in relevance of a type of application (hereinafter referred to as an "application relevance level") is determined, as will be described later, and set as a file attribute.

At S107, the file is converted in format. If it is converted to a highly compressed PDF file a result of the step of identifying a file attribute (S105) is used to effect binarization for characters and tables and employ JPEG for photographs and diagrams for compression and output them to PDF.

Note that highly compressed PDF is a file format that separates an image into a character region and a photograph region and employs methods of compression suitable for the regions, respectively, (JPEG for photographs, binarization and subsequent MMR coding for characters, and the like) to compress the regions and combine them together to achieve a high compression ratio. In contrast, a normal PDF is a file format that exactly compresses a single sheet of image (for a colored image, JPEG is employed, and for a monochromatic binary image, MMR coding is employed, for example, for compression) and writes it on a file. (It is a lower compression than highly compressed PDF.)

At S109, a file attribute is added to the converted file and the file is written. For example if a file is converted to PDF, a file attribute is added as a text object to the converted file and written to the file together with converted data.

Figure 5:
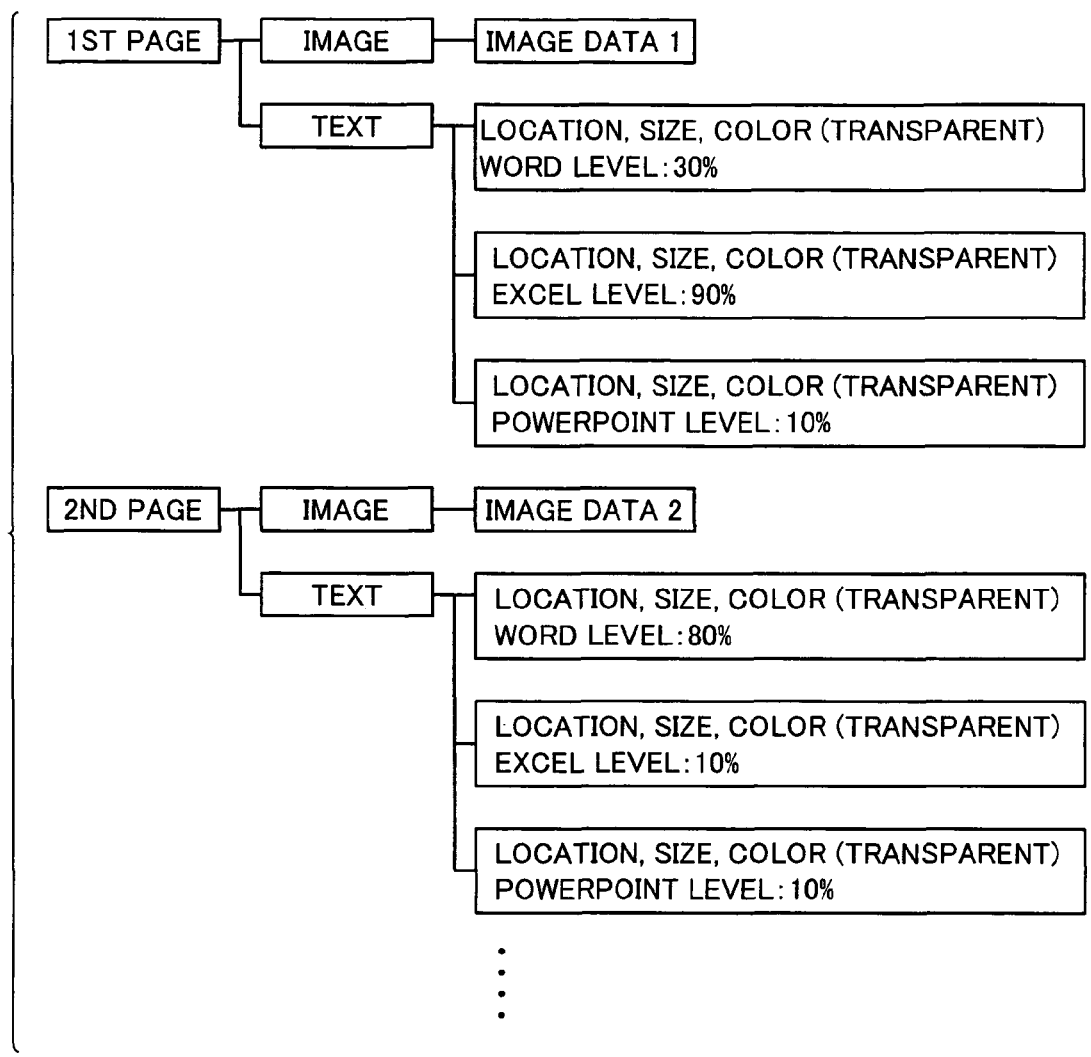
FIG. 5 shows a specific example of a configuration of a PDF file obtained after a document image is converted.

FIG. 5 shows a specific example of a configuration of a PDF file obtained after a document image is converted.

Herein is shown a structure of a file obtained when a document image is converted to PDF and a file attribute is added.

With reference to the figure, for each page the page's converted image data is stored. For the sake of illustration, a first page's image data is referred to as image data 1, and a second page's image data is referred to as image data 2.

The file's attribute/attributes is/are added for each page in the form of a transparent text object. More specifically, the file attribute is recorded in the image data with a transparent character. Herein as the attribute a "WORD level", an "EXCEL level" and a "POWERPOINT level" are recorded for each page. Herein the WORD, EXCEL and POWERPOINT levels are data that can assume values of 0-100% and recorded in the form of a probability what application has been used to create the page (i.e., an application relevance level).

More specifically, with reference to the figure, for the first page, "WORD level: 30%", "EXCEL level: 90%" and "POWERPOINT level: 10%" are file attribute. This indicates that the probability is highest that the first page has been created by Excel.

Figure 6:
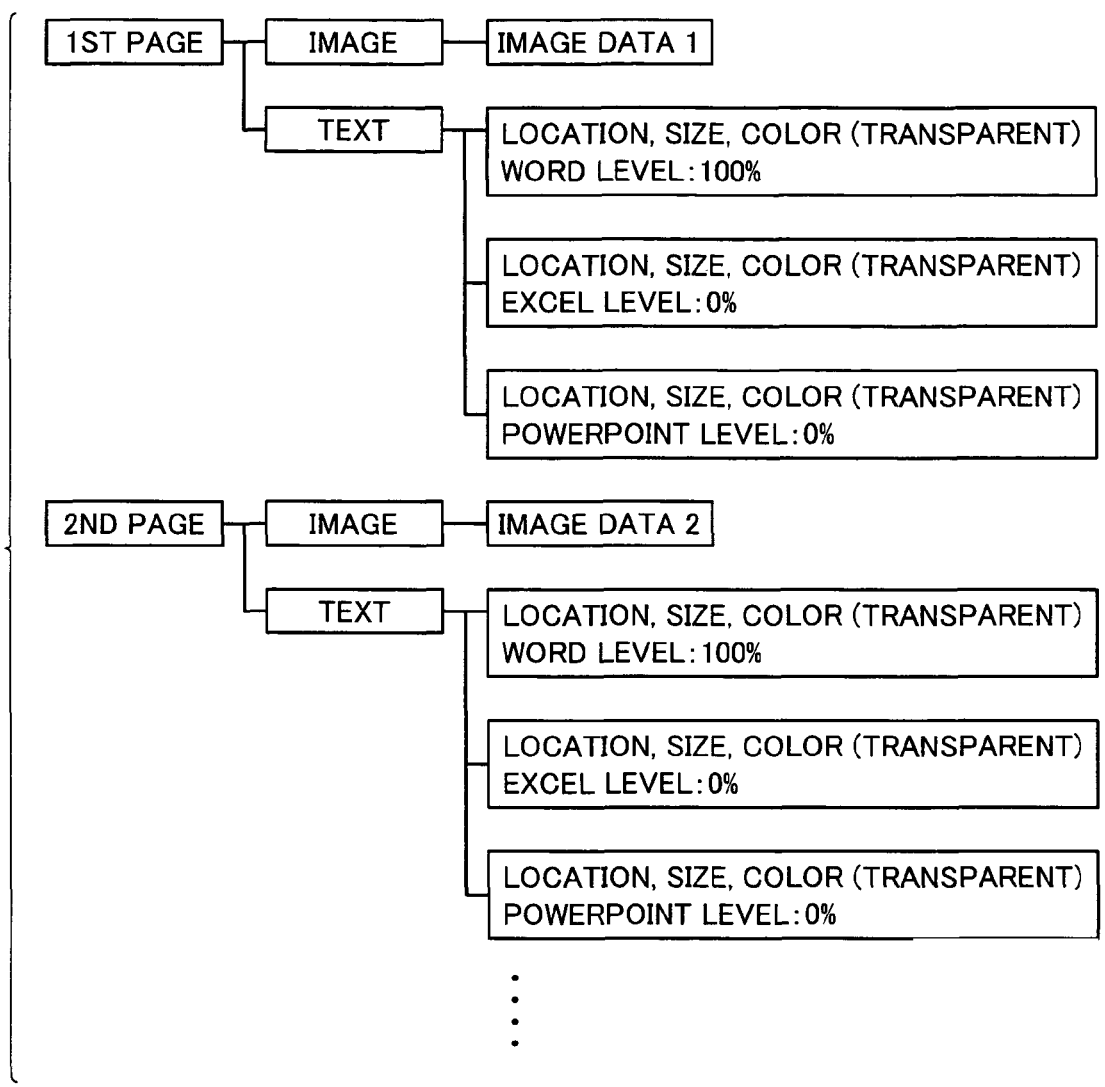
FIG. 6 shows a specific example of a configuration of a PDF file obtained after a document file is converted.

FIG. 6 shows a specific example of a configuration of a PDF file obtained when a document file is converted.

Herein is shown an example of converting a WORD document file. If a document file is converted, what application has been used to create the file is clear from an extension, and accordingly one of WORD, EXCEL and POWERPOINT levels assumes 100% and the others assume 0%. Furthermore, all pages are assigned the same attribute.

Note that if a file is converted to a TIFF file the file can have a property with an attribute embedded therein or a tag with an attribute introduced therein.

Now, with reference to FIG. 5, an application relevance level is determined for each page of a document image, as will be described hereinafter.

A document image is configured of image data, and what application has been used to create the document cannot be clarified from an extension. Accordingly, an application relevance level is determined for each page of the image, as follows:

WORD level=ratio of area of character region to entire page *100

EXCEL level=ratio of area of table region to entire page *100

For the POWERPOINT level a function indicating in percentages a possibility of POWERPOINT is also similarly employed.

Note that for the POWERPOINT level the following expression can be used:

POWERPOINT level=([size of character at top of page]/[font size often used in POWERPOINT]−1)*100, represented in absolute value. When this expression is used, a POWERPOINT level of 0 means a highest POWERPOINT relevance level of the document image of interest. Larger values correspond to lower application relevance levels.

Note that in the above expression, "size of character at top of page" is assumed for example for a title of a slide.

Thus in accordance with the present embodiment when a file is converted in format, the file's attribute(s) and application relevance ratio provided before the file is converted, and a type of application originally used to create the file (for a document image, estimated for example from a table region, a photograph region, a character region and the like) can be added to the converted file. Furthermore, the information that is added can be provided in the form of text to effectively facilitate a search conducted after conversion.

Figure 7:
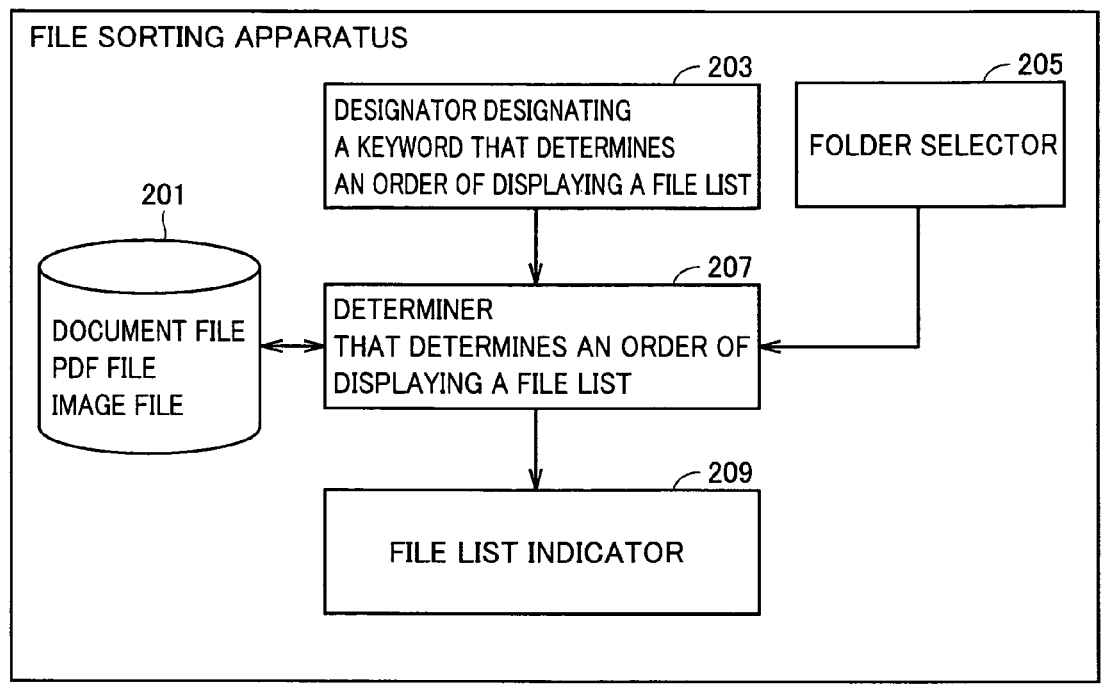
FIG. 7 is a functional block diagram of a file sorting apparatus.

FIG. 7 is a functional block diagram of a file sorting apparatus.

With reference to the figure, the file sorting apparatus includes a file storage 201 storing document, PDF, image and other files, a designator designating a keyword that determines an order of displaying a file list 203, a folder selector 205, a determiner determining an order of displaying a file list 207, and a file list indicator 209.

Designator 203 designates a keyword that determines an order of displaying a file list via GUI.

Folder selector 205 selects a folder for which a file list is displayed via GUI.

Determiner 207 uses the designated keyword to sort a file present in the selected folder.

File list indicator 209 displays a file list in the order determined by determiner 207.

Figure 8:
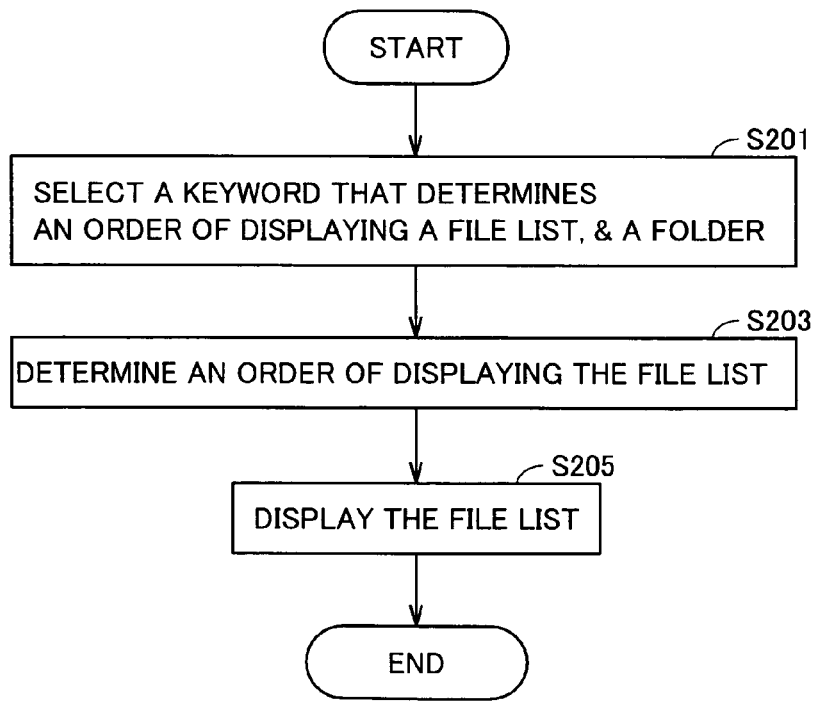
FIG. 8 is a flow chart of an operation of a file sorting apparatus.

FIG. 8 is a flow chart representing an operation of the file sorting apparatus.

With reference to the figure, at S201, a keyword that determines an order of displaying a file list and a folder are selected by and received from a user. The keyword includes an extension, a name of an application originally used to create a file (WORD, EXCEL, POWERPOINT, and the like), a converted file's format, a date and time, and the like.

At S203, an order of displaying a file list is determined. More specifically, a keyword (an attribute) embedded in each file stored in file storage 201 is referred to to determine an order of displaying a file list. When a name of an application originally used to create a file is selected as a searching keyword, an application relevance level attached to a file (see FIGS. 5 and 6) is extracted to determine an order of indication.

At S205, the determined order is followed to display a file list indicating items such as each file's name, extension, date of creation, type of application and the like.

Figure 9:
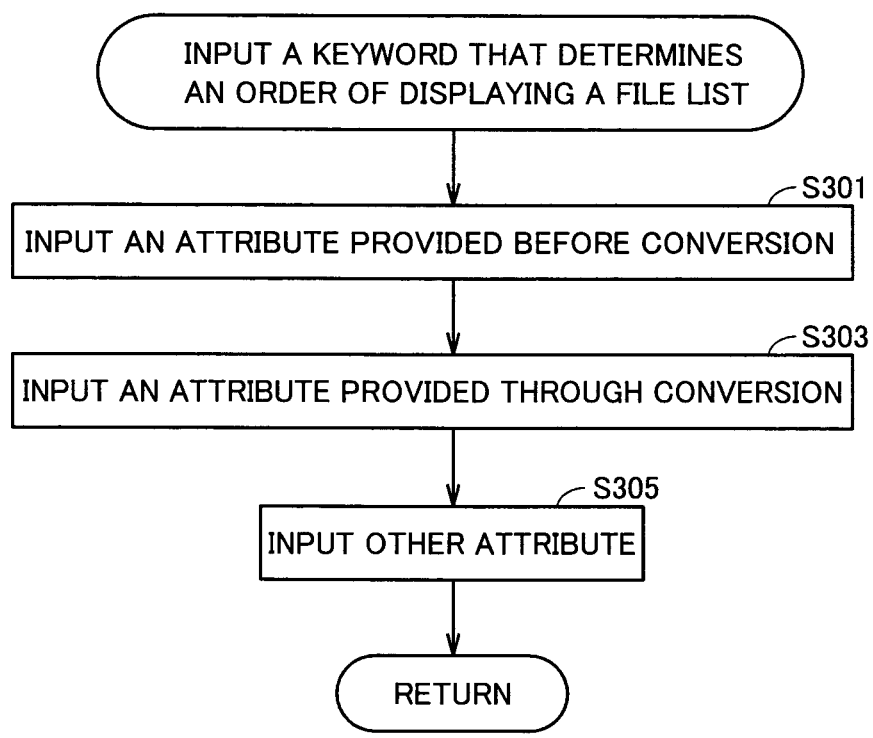
FIG. 9 is a flow chart of a keyword input process performed as shown in FIG. 8 at step (S)201.

FIG. 9 is a flow chart representing a keyword input process performed at S201.

With reference to the figure, at S301 a keyword is input. More specifically, an attribute of a file to be retrieved that is provided before the file is converted (e.g., an extension provided before conversion, a name of an application originally used, a date and time of creation, and the like) is input. At S303, a keyword is input. More specifically, an attribute of the file to be retrieved that is provided after the file is converted (e.g., an extension provided after conversion, a name of an application used for conversion, a date and time of conversion, and the like) is input.

At S305, other attribute is input.

Note that S303 and S305 may be canceled.

FIG. 10 shows a specific example of a file list of files stored in the FIG. 7 file storage 201 that are sorted by their respective dates of creation.

With reference to the figure, for the sake of illustration, file storage 201 has PDF file recorded therein, and for each file, WORD, EXCEL and POWERPOINT's respective application relevance levels are recorded. Furthermore for each file a date of creation is recorded.

Note that while an application relevance level is recorded for each page of a file, as shown in FIGS. 5 and 6, in FIG. 10 each file's has application relevance levels, each as averaged, subjected to management, file by file.

In FIG. 10, a user's instruction is followed to search for, sort and indicate files such that those having earlier dates of creation are displayed first.

FIG. 11 shows a specific example of a file list of files stored in the FIG. 7 file storage 201 that are sorted by their types of applications.

A user's instruction is followed to first indicate files having higher WORD levels. Files with higher WORD levels are initially searched for, sorted and indicated.

It is of course also possible to extract only a file that matches a keyword received at S201 and indicate it as a search result, i.e., to perform a so-called search process.

By such a process a file having been converted for example to PDF can also be searched from and sorted as based on an attribute of the file that is provided before it is converted.

Exemplary Variation

In FIGS. 10 and 11, an application relevance level in the form of an average value of a plurality of pages is subjected to management. If each page has a different application relevance level, adjacent pages that have their respective application relevance levels close to each other may be averaged together. For example, a file having a first half formed of pages created by WORD and a second half formed of pages created by EXCEL (a file formed of a plurality of files combined together) can also appropriately be subjected to management. If such a file is indicated in a list, it may be divided into groups of pages close in application relevance level.

Figure 12:
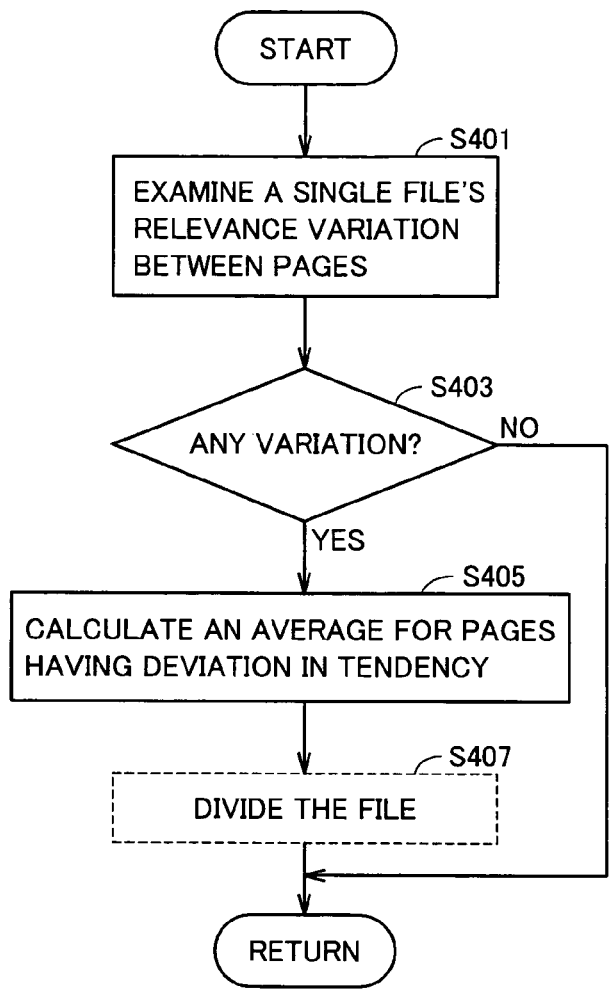
FIG. 12 is a flow chart of a process in an exemplary variation.

FIG. 12 is a flow chart representing a process of the present exemplary variation.

With reference to the figure, at S401 a single file's application relevance level variation (deviation) is examined. At S403 if a decision is made that the variation is no less than a prescribed value then at S405 an average is calculated for pages having deviation in tendency and the average is set as an application relevance level. At S407, the file is divided as required.

Figure 13:
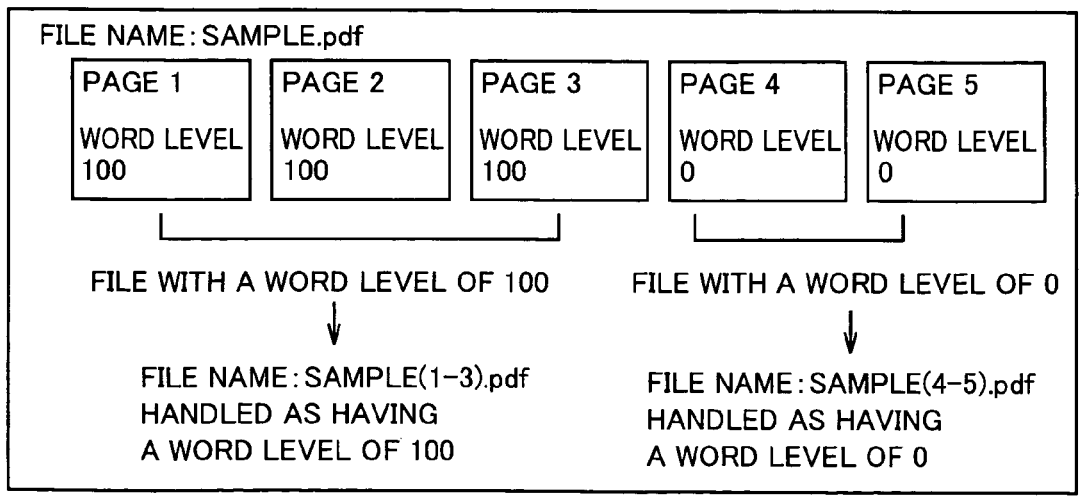
FIG. 13 shows a specific example of a process shown in the FIG. 12 flow chart.

FIG. 13 shows a specific example of the FIG. 12 process.

With reference to the figure, a PDF having a file name "sample.PDF" and formed of five pages is processed and sorted by the WORD level by way of example, as described hereinafter. As shown in the figure, pages 1-5 have Word relevance levels of 100, 100, 100, 0, 0, respectively, for the sake of illustration. In that case, there is a deviation in application relevance level between pages 1-3 and pages 4-5. Accordingly, pages 1-3 are handled as a file having a WORD level of 100 (as averaged) and pages 4 and 5 as a file having a WORD level of 0 (as averaged). If the file is divided then for example the former is automatically assigned a file name "sample (1-3).pdf" and the latter is automatically assigned a file name "sample (4-5).pdf". These file names are formed of the original file's name and the number of pages of the file.

Note that a file may be divided when application relevance level averages have a difference exceeding a threshold value.

Note that there may be provided a program executing the process of the flow chart in the above embodiment, and the program may be recorded on a CD-ROM, a flexible disk, a hard disk, a ROM, a RAM, a memory card or other similar recording media and provided to users. Furthermore, the program may be downloaded to the apparatus via the Internet or other similar communication line.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A format conversion apparatus comprising:
a display that displays information;
a storage device that stores information;
an attribute identifier that determines an attribute of an input or created file based on an extension of said file;
a file converter that converts a format of said file; and
an attribute adder that adds, as additional information to the file when the file is converted, the attribute of said file based on the extension of said file determined prior to conversion of said file, thereby making available the attribute of the prior created file within the converted file.

2. The apparatus of claim 1, wherein said attribute of said unconverted file is information indicating an application used to create said file.

3. The apparatus of claim 1, wherein said file is formed of a plurality of pages and said additional information is added for each page.

4. The apparatus of claim 1, wherein the additional information is added to the converted file.

5. The apparatus of claim 1, wherein said storage device stores a plurality of files of which format have been converted by said file converter and
the apparatus further comprising:
a first input device receiving from a user an attribute prior to format conversion of a file to be retrieved as desired from among said files stored in said storage device;
a reader reading an attribute of said file stored in said storage device; and
a searcher searching said storage for a desired file as based on said attribute received by said first input device and said attribute read by said reader.

6. The apparatus of claim 5, further comprising a second input device receiving from said user an attribute after format conversion of a file to be searched for, wherein said searcher searches said storage for a desired file as based on said attribute received by said first input device and said attribute received by said second input device.

7. The apparatus of claim 5, wherein:
said storage device additionally records information indicating an application used to create a file, said file still being unconverted in format; and
said searcher indicates in order a file retrieved as based on said information indicating said application.

8. A format conversion program product embodied on a tangible computer readable storage medium causing a computer to execute the steps of:
determining an attribute of an input or created file based on an extension of said file;
converting a format of said file; and
adding, as additional information to the file when the file is converted, the attribute of said file based on the extension of said file determined prior to conversion of said file, thereby making available the attribute of the prior created file within the converted file.

9. The product of claim 8, wherein said attribute of said unconverted file is information indicating an application used to create said file.

10. The product of claim 8, wherein said file is formed of a plurality of pages and said additional information is added for each page.

11. The product of claim 8, wherein the additional information is added to the converted file.

12. A computer-readable recording medium having a first program recorded thereon, said computer-readable recording medium is embodied in a computer, the first program causing the computer to execute the steps of:
determining an attribute of an input or created file based on an extension of said file;
converting a format of said file; and
adding, as additional information to the file when the file is converted, the attribute of said file based on the extension of said file determined prior to conversion of said file, thereby making available the attribute of the prior created file within the converted file.

13. The computer-readable recording medium of claim 12, further having a second program recorded thereon, the second program causing the computer to execute the steps of:
receiving from a user an attribute prior to format conversion of a file to be retrieved as desired from among files of which format have been converted by said first program and stored in a storage;
reading an attribute of said file stored in said storage; and
searching said storage for a desired file as based on said attribute received at the step of receiving and said attribute read at the step of reading.

14. A method of converting a format of a file, comprising the steps of:
determining, by a processor, an attribute of an input or created file based on an extension of said file;
converting, by the processor, a format of said file; and
adding, by the processor, as additional information to the file when the file is converted, the attribute of said file based on said extension of said file determined prior to conversion of said file, thereby making available the attribute of the prior created file within the converted file.

15. The method of claim 14, wherein said attribute of said unconverted file is information indicating an application used to create said file.

16. The method of claim 14, wherein said file is formed of a plurality of pages and said additional information is added for each page.

17. The method of claim 14, wherein the additional information is added to the converted file.

18. The method of claim 14, further comprising the steps of
receiving, by the processor, from a user an attribute prior to format conversion of a file to be retrieved as desired from among files of which format have been converted by said first program and stored in a storage;
reading, by the processor, an attribute of said file stored in said storage; and
searching, by the processor, said storage for a desired file as based on said attribute received at the step of receiving and said attribute read at the step of reading.

19. A format conversion apparatus comprising:
a display that displays information;
a storage device that stores information;
an attribute identifier that determines an attribute of an input or created file based on an image of said file;
a file converter that converts a format of said file; and
an attribute adder that adds, as additional information to the file when the file is converted, the attribute of said file based on the image of said file determined prior to conversion of said file, thereby making available the attribute of the prior created file within the converted file.

20. The apparatus of claim 19, wherein said attribute of said unconverted file is information indicating an application used to create said file.

21. The apparatus of claim 19, wherein said file is formed of a plurality of pages and said additional information is added for each page.

22. The apparatus of claim 19, wherein the additional information is added to the converted file.

23. A format conversion program product embodied on a computer readable storage medium causing a computer to execute the steps of:

determining an attribute of an input or created file based on an image of said file;

converting a format of said file; and adding, as additional information to the file when the file is converted, the attribute of said file based on the image of said file determined prior to conversion of said file.

24. The product of claim 23, wherein said attribute of said unconverted file is information indicating an application used to create said file.

25. The product of claim 23, wherein said file is formed of a plurality of pages and said additional information is added for each page.

26. A recording medium having a program recorded therein, said program being the product of claim 23.

27. The product of claim 23, wherein the additional information is added to the converted file.

28. A method of converting a format, comprising the steps of:

determining an attribute of an input or created file based on an image of said file;

converting a format of said file; and adding as additional information to the file when the file is converted, the attribute of said file based on the image of said file determined prior to conversion of said file.

29. The method of claim 28, wherein said attribute of said unconverted file is information indicating an application used to create said file.

30. The method of claim 28, wherein said file is formed of a plurality of pages and said additional information is added for each page.

31. The method of claim 28, wherein the additional information is added to the converted file.

\* \* \* \* \*